United States Patent
Taguchi et al.

(10) Patent No.: US 11,017,523 B2
(45) Date of Patent: May 25, 2021

(54) INSPECTION DEVICE AND PTP PACKAGING MACHINE

(71) Applicant: CKD Corporation, Aichi (JP)

(72) Inventors: Yukihiro Taguchi, Aichi (JP); Takamasa Ohtani, Aichi (JP)

(73) Assignee: CKD CORPORATION, Aichi (JP)

( * ) Notice: Subject to any disclaimer, the term of this patent is extended or adjusted under 35 U.S.C. 154(b) by 111 days.

(21) Appl. No.: 16/422,616

(22) Filed: May 24, 2019

(65) Prior Publication Data

US 2019/0279350 A1 Sep. 12, 2019

Related U.S. Application Data

(63) Continuation of application No. PCT/JP2017/019328, filed on May 24, 2017.

(30) Foreign Application Priority Data

Nov. 29, 2016 (JP) .............................. JP2016-231093

(51) Int. Cl.
*G06T 7/00* (2017.01)
*B32B 3/26* (2006.01)
(Continued)

(52) U.S. Cl.
CPC ................ *G06T 7/001* (2013.01); *B32B 3/26* (2013.01); *B32B 15/082* (2013.01);
(Continued)

(58) Field of Classification Search
CPC ....... B32B 15/20; B32B 3/26; B32B 2439/80; B32B 15/085; B32B 15/082;
(Continued)

(56) References Cited

U.S. PATENT DOCUMENTS

2003/0007677 A1* 1/2003 Hiroi ....................... G06T 7/001
382/149
2007/0286471 A1* 12/2007 Kaneda ................ G01N 21/892
382/141
(Continued)

FOREIGN PATENT DOCUMENTS

JP 200133390 A 2/2001
JP 200185482 A 3/2001
(Continued)

OTHER PUBLICATIONS

Riggio, Mariapaola, Jakub Sandak, and Steffen Franke. "Application of imaging techniques for detection of defects, damage and decay in timber structures on-site." Construction and Building Materials 101 (2015): 1241-1252. (Year: 2015).*

(Continued)

*Primary Examiner* — Pinalben Patel
(74) *Attorney, Agent, or Firm* — Osha Bergman Watanabe & Burton LLP

(57) ABSTRACT

An inspection device for inspecting an inspection object portion in a PTP sheet, the inspection device including: an irradiator that irradiates the inspection object portion with light; an imaging device that takes an image of the inspection object portion irradiated with the light; a processor that detects a defect in the inspection object portion from the taken image by using a predetermined luminance threshold value, and determines whether the inspection object portion is non-defective; a verification image generating circuit that generates a verification image in which a virtual defective image is placed in a non-defective image; and a threshold value verifier that causes the processor to determine whether the inspection object portion is non-defective or defective by using the verification image, in place of the image taken by (Continued)

the imaging device, and to verify the luminance threshold value based on a determination result by the processor.

8 Claims, 9 Drawing Sheets

(51) Int. Cl.
| | | |
|---|---|---|
| B32B 15/082 | (2006.01) | |
| B32B 15/085 | (2006.01) | |
| B32B 15/20 | (2006.01) | |
| B65B 9/04 | (2006.01) | |
| B65B 57/02 | (2006.01) | |
| B65B 57/00 | (2006.01) | |
| G01N 21/892 | (2006.01) | |
| G01N 21/93 | (2006.01) | |
| G01N 21/85 | (2006.01) | |
| H04N 5/247 | (2006.01) | |
| H04N 5/372 | (2011.01) | |

(52) U.S. Cl.
CPC ............ *B32B 15/085* (2013.01); *B32B 15/20* (2013.01); *B65B 9/04* (2013.01); *B65B 9/045* (2013.01); *B65B 57/00* (2013.01); *B65B 57/02* (2013.01); *G01N 21/85* (2013.01); *G01N 21/892* (2013.01); *G01N 21/93* (2013.01); *B32B 2439/80* (2013.01); *G06T 2207/30108* (2013.01); *H04N 5/247* (2013.01); *H04N 5/372* (2013.01)

(58) Field of Classification Search
CPC ................. G01N 21/892; G01N 21/93; G01N 2021/8883; G01N 21/8851; G01N 2021/936; G01N 21/9508; G01N 21/85; B65B 9/04; B65B 57/02; B65B 7/164; B65B 61/065; B65B 57/00; B65B 9/045; H04N 5/247; H04N 5/372; G06T 2207/30108; G06T 7/001
See application file for complete search history.

(56) References Cited

U.S. PATENT DOCUMENTS

| | | | |
|---|---|---|---|
| 2011/0285843 A1* | 11/2011 | Saeki | ...................... G06T 7/001 348/135 |
| 2014/0078498 A1* | 3/2014 | Ikushima | ............... G01N 21/88 356/237.1 |
| 2014/0093139 A1* | 4/2014 | Yamagishi | ......... H04N 1/00015 382/112 |
| 2017/0138868 A1* | 5/2017 | Barak | ...................... G06T 7/136 |

FOREIGN PATENT DOCUMENTS

| | | |
|---|---|---|
| JP | 2006194657 A | 7/2006 |
| JP | 4317566 B2 | 8/2009 |
| JP | 201474709 A | 4/2014 |
| JP | 201474710 A | 4/2014 |
| JP | 201575437 A | 4/2015 |
| JP | 2015203640 A | 11/2015 |

OTHER PUBLICATIONS

Chondronasios, Apostolos, Ivan Popov, and Ivan Jordanov. "Feature selection for surface defect classification of extruded aluminum profiles." The International Journal of Advanced Manufacturing Technology 83.1-4 (2016): 33-41. (Year: 2016).*
International Preliminary Report on Patentability issued in corresponding International Application No. PCT/JP2017/019328, with translation, dated Jun. 13, 2019 (15 pages)
International Search Report issued in corresponding International Application Na PCT/JP2017/019328, dated Aug. 8, 2017, with translation thereof (5 pages).

* cited by examiner

INSPECTION DEVICE AND PTP PACKAGING MACHINE

BACKGROUND

Technical Field

The present invention relates to an inspection device used to inspect a Press-Through-Pack (PTP) sheet or a portion of a PTP film forming a PTP sheet, as well as to a PTP packaging machine including the inspection device.

Description of Related Art

The PTP sheet includes a container film that has pocket portions filled with contents such as tablets or capsules and a cover film that is mounted to the container film such as to seal openings of the pocket portions.

The PTP sheet is manufactured by a PTP packaging machine. The PTP packaging machine includes a pocket portion forming unit configured to form pocket portions in a strip-like container film; a filling unit configured to fill contents into the pocket portions; a sealing unit configured to mount a cover film to the container film and thereby obtain a strip-like PTP film; and a sheet punching unit configured to punch out the PTP film in the unit of sheets and thereby provide PTP sheets.

In a manufacturing process of the PTP sheet, an inspection device is provided along a conveyance path of the container film. The inspection device conducts an inspection of a predetermined inspection object portion in a PTP sheet or a portion that eventually forms a PTP sheet (as described in, for example, Patent Literature 1). The inspection device includes an irradiator configured to irradiate the inspection object portion with light; an imaging unit configured to take an image of the inspection object portion irradiated with the light; and a quality judgment unit. The quality judgment unit detects the presence or the absence of a defect in the inspection object portion, based on the image taken by the imaging unit, so as to judge the inspection object portion as non-defective or as defective. More specifically, the quality judgment unit uses preset luminance threshold value to detect a defect with regard to the appearance abnormality of a content or a sheet portion, for example, break of the content (for example, peel-off of the surface of the content), adhesion of a foreign substance to the content, or quality of sealing in the sheet portion.

CITATION LIST

Patent Literature
 Patent Literature 1: JP 2001-33390A

Verification of whether an inspection by the inspection device is normally conducted, i.e., verification of whether the set luminance threshold value is appropriate, is performed, for example, prior to operation of the inspection device. A general procedure of such verification creates a plurality of sheets expected to be judged as defective by the quality judgment unit (defective sheets) according to the types of defects or the like, feeds supply defective sheets to the inspection device and determines whether appropriate inspection results are output from the inspection device.

It is, however, not easy to provide a plurality of defective sheets, and it takes time to actually conduct an inspection for the plurality of defective sheets. This means that so much labor and time are likely to be required for the verification. There is also a possibility that a foreign substance flows out from the defective sheet. In the event of flow-out of the foreign substance, an excess operation (for example, an operation for searching a foreign substance in the PTP packaging machine) is required to deal with the flow-out of the foreign substance.

Additionally, in order to create the defective sheet, there is a need to provide an actual object of a component of the PT sheet, for example, a content. Verification can not be performed when the content or the like is not present at hand.

SUMMARY

An inspection device of one or more embodiments performs verification of set luminance threshold values without using an actual defective sheet and thereby significantly reduces the labor and the time required for verification and improves the convenience of the verification, as well as a PTP packaging machine.

Embodiments of the present invention are described. Functions and advantageous effects that are characteristic of one or more embodiments are also described as appropriate.

An inspection device of one or more embodiments is configured to conduct an inspection of a predetermined inspection object portion in a PTP sheet or in a portion that eventually forms the PTP sheet in a manufacturing process of the PTP sheet configured such that a content is contained in a pocket portion formed in a container film and a cover film is bonded to the container film to close the pocket portion. The inspection device comprises an irradiator configured to irradiate at least the inspection object portion with predetermined light; an imaging unit configured to take an image of the inspection object portion irradiated with the light emitted from the irradiator; a quality judgment unit configured to detect presence or absence of a defect in the inspection object portion from the image taken by the imaging unit by using a predetermined luminance threshold value and thereby judge the inspection object portion as non-defective or defective; a verification image generating unit configured to generate a verification image with a virtual defective image placed in a non-defective image that is judged as non-defective by the quality judgment unit; and a threshold value verifying unit configured to cause the quality judgment unit to judge the inspection object portion as non-defective or defective by using the verification image, in place of the image taken by the imaging unit and to verify the luminance threshold value, based on a result of the judgement. A luminance of the defective image is set, based on a luminance of a portion of the non-defective image where the defective image is placed.

The non-defective image may be an image actually obtained by using the irradiator and the imaging unit or may be an image obtained by a predetermined simulator or the like based on conditions of inspection (for example, the type of the content and the intensity of the light emitted from the irradiator).

The configuration of one or more embodiments enables verification of the luminance threshold value used for detection of a defect to be performed by using a verification image that has a defective image placed in a non-defective image. Accordingly, there is no need to actually provide a defective sheet or to actually conduct an inspection for the purpose of verification. This significantly reduces the labor and the time required for the verification. Since the defective sheet is not required, there is no occurrence of flow-out of any foreign substance from the defective sheet. Additionally, verification can be performed by providing a verification image even at the stage that there is no actual object such as the content as the inspection object. This configuration enhances the convenience of verification.

The luminance of an inspection object portion (the content or the sheet portion) generally differs depending on the type of the content or the constituent material of the sheet portion. One possible measure may use a commonly usable defective image, irrespective of the difference in type of the content. Such a defective image may be an image having a luminance that is detectable as a defect irrespective of a certain level of variation in luminance of the inspection object portion, for example, an image simulating hair and more specifically may be an image having a sufficiently large luminance difference from the inspection object portion.

The verification using such a defective image is, however, only verification of whether a defect having the minimum level of luminance threshold values is detectable. This is not capable of verifying whether the luminance threshold values provide a required detection capability of a defect, when there is a requirement for the higher detection capability of a defect (when there is a requirement for detection of the smaller foreign substance).

According to the above embodiments, on the other hand, the luminance of a defective image is set on the basis of the luminance of a portion of a non-defective image where the defective image is placed. For example, when a defective image simulating a foreign substance is placed on a content in a non-defective image, the luminance of the defective image is set on the basis of the luminance of the content. In another example, when a defective image simulating a foreign substance is placed on a sheet portion in a non-defective image, the luminance of the defective image is set on the basis of the luminance of the sheet portion. Accordingly, this configuration allows for verification of whether the luminance threshold value is appropriate in detection of a defect (for example, a small foreign substance) having a luminance that is close to the luminance of the content or the luminance of the sheet portion. This configuration is capable of verifying whether the luminance threshold value provides a required detection capability of a defect.

In the inspection device of the above embodiments, the irradiator may be configured to radiate lights of multiple different wavelength components, and the luminance of the defective image may be set independently according to the light of each of the wavelength components.

The irradiator may be configured to simultaneously radiate lights of multiple different wavelength components or may be configured to individually radiate lights of multiple different wavelengths. The lights of the multiple different wavelength components include, for example, near-infrared light [light having the wavelength of approximately 760 nm to approximately 1100 nm (more appropriately, 650 nm to 950 nm)], red color light (light having the wavelength of approximately 620 nm to approximately 750 nm), blue color light (light having the wavelength of approximately 400 nm to approximately 495 nm), and green color light (light having the wavelength of approximately 495 nm to approximately 570 nm).

In a certain type of defect, the luminance difference between a defective part and a non-defective part is likely to vary according to the wavelength component of radiating light. Based on this fact, the configuration of the above embodiments enables lights of multiple different wavelength components to be emitted from the irradiator. This configuration enables a wide range of (multiple different) defects to be detected with high accuracy.

The luminance of the content and the luminance of the sheet portion in the image taken by the imaging unit may differ depending on the wavelength component of light. The configuration of the above embodiments enables the luminance of a defective image to be set independently according to the light of each wavelength component. Accordingly, this configuration enables the luminance of a defective image to be set appropriately with regard to the respective images obtained by using the lights of multiple different wavelength components. As a result, this configuration allows for verifying of whether the luminance threshold value is appropriate in detection of a wide range of defects.

In the inspection device of the above embodiments, the defective image may include a dark defective image having a luminance that is set based on a luminance of a portion of the non-defective image where the dark defective image is placed, such as to be lower than the luminance of the portion; and a bright defective image having a luminance that is set based on a luminance of a portion of the non-defective image where the bright defective image is placed, such as to be higher than the luminance of the portion.

In one or more embodiments, the respective luminances of the image indicating a dark defective of a relatively low luminance and an image indicating a bright defective of a relatively high luminance are set on the basis of the luminance of the portion of the non-defective image where the defective image is placed. This configuration accordingly allows for verification of whether the luminance threshold value is appropriate in detection of a dark defect and a bright defect. More specifically, this configuration allows for verification of whether the luminance threshold value is appropriate in detection of a wider range of defects.

In the inspective device of the above embodiments, the defective image may have a luminance that is set based on a luminance of a portion of the non-defective image where the defective image is placed, such as to be lower than the luminance of the portion and that is set to gradually increase outward from a center thereof.

In one or more embodiments, the dark defective image is set to gradually increase the luminance outward from the center. More specifically, the dark defective image has an identical mode with the mode of an image of a foreign substance obtained when the image of the foreign substance is actually taken in inspection. This configuration allows for verification of the luminance threshold value conforming to the actual inspection.

There is provided a PTP packaging machine comprising the inspection device described above.

The configuration of one or more embodiments has similar functions and advantageous effects to those of the embodiments described above.

DETAILED DESCRIPTION OF EMBODIMENTS

Figure 1:
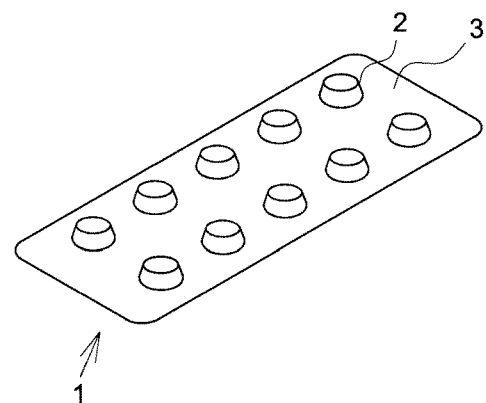
FIG. 1 is a perspective view illustrating a PTP sheet according to one or more embodiments.
Figure 2:
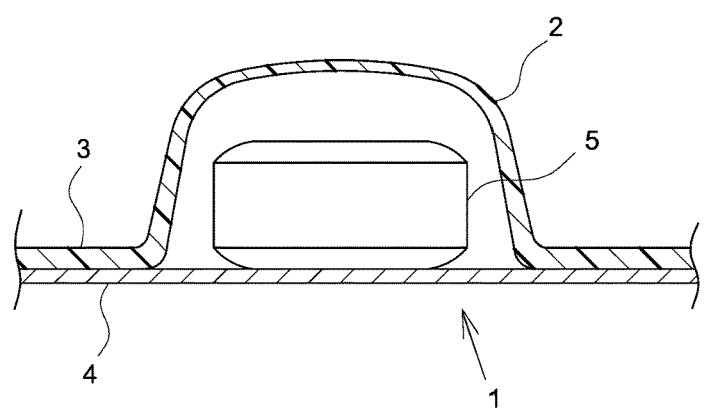
FIG. 2 is a partly broken enlarged front view illustrating the PTP sheet according to one or more embodiments.

The following describes embodiments with reference to drawings. A Press-Through-Pack (PTP) sheet 1 is described first. As shown in FIG. 1 and FIG. 2, the PTP sheet 1 includes a container film 3 provided with a plurality of pocket portions 2, and a cover film 4 mounted to the container film 3 such as to close the respective pocket portions 2.

The container film 3 is formed from a transparent or translucent thermoplastic resin material, such as PP (polypropylene) or PVC (polyvinyl chloride). The cover film 4 is, on the other hand, composed of an opaque material (for example, aluminum foil) with a sealant that is made of, for example, a polyester resin and that is applied on a surface thereof.

The PTP sheet 1 is formed in an approximately rectangular shape in planar view and has two arrays of pockets formed along a sheet short direction. Each pocket array is comprised of five pocket portions 2 that are arrayed along a sheet longitudinal direction. Accordingly, a total of ten pocket portions 2 are formed. One tablet 5 is placed as a content in each of the pocket portions 2.

Figure 3:
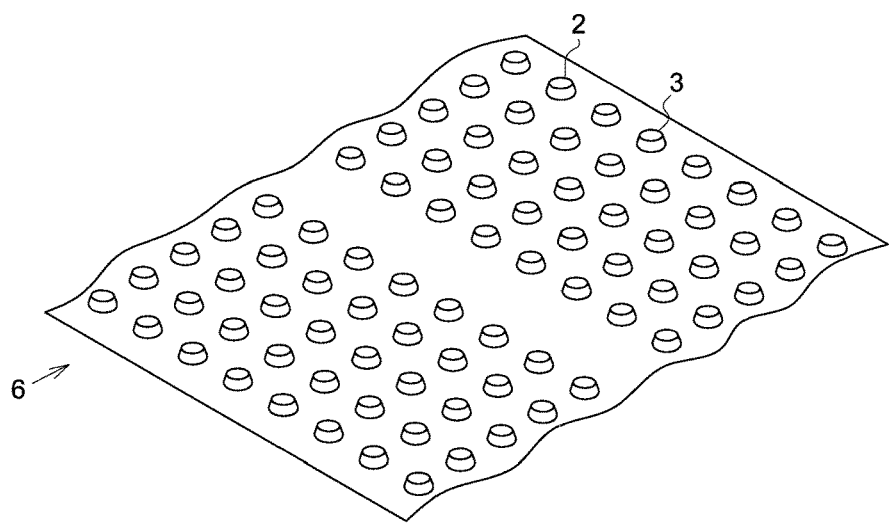
FIG. 3 is a perspective view illustrating a PTP film according to one or more embodiments.

The PTP sheet 1 is manufactured by punching sheets from a strip-shaped PTP film 6 (shown in FIG. 3) that is comprised of the strip-shaped container film 3 and the strip-shaped cover film 4.

The following describes the general configuration of a PTP packaging machine 11 used to manufacture the PTP sheet 1 described above, with reference to FIG. 4.

A film roll of the strip-shaped container film 3 is wound in a roll form on a most upstream side of the PTP packaging machine 11. A pullout end of the container film 3 wound in the roll form is guided by a guide roll 13. The container film 3 is then laid on an intermittent feed roll 14 provided on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. The container film 3 is heated to be relatively soft by the heating device 15, and the plurality of pocket portions 2 are then formed at predetermined positions of the container film 3 by the pocket portion forming device 16. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 to the state of tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is provided along the conveyance path of the container film 3 between the guide roll 19 and the film receiving roll 20. The tablet filling device 21 serves as the filling unit to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation.

A film roll of the strip-shaped cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are fed between the two rolls 20 and 25. The container film 3 and the cover film 4 pass through between the two rolls 20 and 25 in the heated and pressed contact state, so that the cover film 4 is attached to the container film 3 such as to close the respective pocket portions 2. This series of operations provides the PTP film 6 manufactured such that the tablet 5 is filled in each of the pocket portions 2.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 to the state of tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 to the state of tension by an elastic force and serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is provided along the conveyance path of the PTP film 6 between the intermittent feed roll 32 and the tension roll 35. The sheet punching device 37 serves to punch out the outer periphery of each portion of the PTP film 6 in the unit of PTP sheet 1.

The PTP sheets 1 punched out by the sheet punching device 37 are conveyed by an extraction conveyor 38 and are once accumulated in a finished product hopper 39. In the case of defective judgment of the PTP sheet 1 by inspection units 52 and 53 described later, a defective signal is sent to a defective sheet discharge mechanism 40 provided along the conveyance path formed by the extraction conveyor 38. The PTP sheet 1 judged as defective is separately discharged by the defective sheet discharge mechanism 40 and is transferred to a non-illustrated defective hopper.

A cutting device 41 is provided on a downstream side of the continuous feed roll 36. An unrequired film portion 42 that is a residual part (scrap part) remaining in a belt-like form after punching by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 19, 20, 28, 31 and 32 described above is arranged such that the roll surface is opposed to the pocket portions 2. The surface of each roll, for example, the roll 14, has recesses that are formed to place the pocket portions 2 therein. This configuration basically suppresses the pocket portions 2 from being crushed. The feeding operation with the pocket portions 2 placed in the recesses of each roll, for example, the roll 14, achieves the reliable intermittent feed and continuous feed.

The PTP packaging machine 11 is further provided with an inspection device 51 configured to inspect a portion that eventually forms the PTP sheet 1. The inspection device 51 includes, for example, a pre-sealing inspection unit 52, a post-sealing inspection unit 53 and a verification device 54.

The pre-sealing inspection unit 52 is an inspection unit having both the transmitted light-based inspecting function and reflected light-based inspecting function to perform inspection from a protruded portion side and an opening side of the pocket portions 2 of the container film 3 (i.e., from a surface side and a rear face side of the tablets 5) prior to sealing. The pre-sealing inspection unit 52 is provided between the tablet filling device 21 and the film receiving roll 20 and is configured to conduct an inspection for the presence or the absence of a defect in the tablet 5 or in the container film 3 (sheet portion).

The post-sealing inspection unit 53 is a reflected light-based inspection unit that performs inspection from the protruded portion side of the pocket portions 2 of the container film 3 (PTP film 6) (i.e., from the surface side of the tablets 5) after sealing. The post-sealing inspection unit 53 is provided between the film receiving roll 20 and the tension roll 27 and is configured to conduct an inspection for the presence or the absence of a defect in the tablet 5 or in the PTP film 6 (sheet portion). According to one or more embodiments, the tablets 5 and portions of the container film 3 and the PTP film 6 that eventually form the PTP sheet 1 correspond to inspection target portions.

Each of the inspection units 52 and 53 is provided with a lighting device 60 serving as the irradiator, a camera 61 serving as the imaging unit (imaging device), and a processing device 62 serving as the quality judgment unit.

The lighting device 60 is configured to irradiate the tablets 5 and the portion of the container film 3 or the PTP film 6 that eventually forms the PTP sheet 1 with predetermined light both from the opening side and from the protruded portion side of the pocket portions 2.

The lighting device 60 of the pre-sealing inspection unit 52 is configured to emit white light. The white light includes lights of a plurality of different wavelength components. According to one or more embodiments, light of a red (R) color component (light having wavelength of about 620 nm to about 750 nm), light of a blue (B) color component (light having wavelength of about 400 nm to about 495 mm) and light of a green (G) color component (light having wavelength of about 495 nm to about 570 nm) are emitted from the lighting device 60.

The pre-sealing inspection unit 52 includes the two lighting devices 60 that are respectively placed on the respective sides, i.e., the protruded portion side and the opening side, of the pocket portions 2 of the container film 3.

The lighting device 60 of the post-sealing inspection unit 53 is, on the other hand, configured to emit near-infrared light [light having wavelength of about 760 nm to about 1100 nm (or more appropriately having wavelength of 850 nm to 950 nm)]. The lighting device 60 of the post-sealing inspection unit 53 is placed on the protruded portion side of the pocket portions 2 of the container film 3 (PTP film 6).

The camera 61 has sensitivity in a wavelength domain of the light emitted from the lighting device 60.

A three primary color RGB-type CCD camera is employed as the camera 61 of the pre-sealing inspection unit 52. Three images of the red (R) color component, the green (G) color component and the blue (B) color component are obtained by extracting respective color signals of the red (R) color, the green (G) color and the blue (B) color from an image signal obtained by imaging with the camera 61. A plurality of images are obtained by using such lights of different wavelength components. This is based on the fact that a luminance difference between a defective part and a non-defective part in an inspection target portion is likely to vary according to the wavelength component of radiating light.

The pre-sealing inspection unit 52 includes two cameras 61 that are placed on the opening side of the pocket portions 2 of the container film 3. One camera 61 is used to take a two-dimensional image of light transmitted through the container film 3, out of the light emitted from the lighting device 60 on the protruded portion side of the pocket portions 2. The other camera 61 (color CCD camera) is used to take a two-dimensional image of light reflected by the tablet 5, out of the light emitted from the lighting device 60 on the opening side of the pocket portions 2.

A CCD camera having sensitivity to near-infrared light is employed, on the other hand, as the camera 61 of the post-sealing inspection unit 53. The camera 61 of the post-sealing inspection unit 53 is placed on the protruded portion side of the pocket portions 2 of the container film 3 (PTP film 6). In the post-sealing inspection unit 53, the camera 61 is used to take a two-dimensional image of light reflected by the tablet 5 or by the cover film 4, out of the light (near-infrared light) emitted from the lighting device 60.

The images obtained by the cameras 61 are input into the processing device 62. The processing device 62 is configured as a computer system including a CPU as the operation unit, a ROM that stores various programs, and a RAM that temporarily stores various data including calculation data and input and output data. The processing device 62 includes an image memory 63, an inspection result storage device 64, a judgment memory 65, an image/inspection condition storage device 66, a camera timing control device 67 and a CPU and input/output interface 68.

The image memory 63 is configured to store images taken by the cameras 61. Inspection is performed, based on the images stored in this image memory 63. The images may be subjected to processing, prior to the inspection. The processing includes, for example, a masking process and shading correction. The shading correction serves to correct a variation in brightness of light caused by the difference in position, since there are technical limitations in uniformly irradiating an entire imaging range of, for example, the container film 3 with light emitted from the lighting device 60. Binarized images obtained by performing a binarization process and masking images obtained by a masking process are also stored in the image memory 63.

The inspection result storage device 64 is configured to store, for example, data of coordinates and the like with regard to images, data of quality judgment results with regard to inspection target portions, and statistical data obtained by processing the preceding data by probability statistics. Such data of quality judgment results and statistical data may be displayed in a predetermined display device (not shown).

The judgment memory 65 is configured to store reference values (for example, threshold values) used for inspection. The reference value is set for each inspection item. The reference values used for inspection include, for example, dimensions of the PTP sheet 1, the pocket portion 2, the tablet 5 and the like, shape and dimensions of each of various window frames provided to define respective inspection areas, luminance threshold values involved in the binarization process, reference values involved in area determination, and color reference values involved in color identification inspection. The reference values include reference values determined by statistics of inspection measurement results with regard to non-defective products determined in past inspections, for example, reference values used for inspection of tablet area values.

The luminance threshold values involved in the binarization process are used to identify a defective part from an image. The luminance threshold values used include a first tablet luminance threshold value $\delta x1$ and a second tablet luminance threshold value $\delta x2$ used to identify a defective part of the tablet 5 and a sheet luminance threshold value $Sy$ used to identify a defective part of the sheet portion (the container film 3 or the PTP film 6).

The first tablet luminance threshold value $\delta x1$ is used to identify a bright defect of the tablet 5 that is displayed in a relatively bright mode in an area of the image occupied by the tablet 5. The bright defect of the tablet 5 occurs, for example, when the tablet 5 is a sugarcoated tablet and has a peeled-off sugar-coat. The first tablet luminance threshold value $\delta x1$ is set to be lower than an expected luminance of a bright defect of the tablet 5 obtained in advance but to be higher than the luminance of the surface of the tablet 5. Binarization of an image obtained by the camera 61 by using the set first tablet luminance threshold value $\delta x1$ provides a value 0 for a bright defective part and a value 1 for the surface of the tablet 5 in a resulting binarized image.

The second tablet luminance threshold value $\delta x2$ is used to identify a dark defect of the tablet 5 that is displayed in a relatively dark mode in the area of the image occupied by the tablet 5. The dark defect of the tablet 5 occurs, for example, when a foreign substance such as hair adheres to the tablet 5. The second tablet luminance threshold value $\delta x2$ is set to be higher than an expected luminance of a dark defect of the tablet 5 obtained in advance but to be lower than the luminance of the surface of the tablet 5. Binarization of an image obtained by the camera 61 by using the set second tablet luminance threshold value $\delta x2$ provides a value 0 for the presence of a foreign substance part and the value 1 for the surface of the tablet 5 in a resulting binarized image.

The sheet luminance threshold value $\delta y$ is used to identify a dark defect of the sheet portion that is displayed in a relatively dark mode in an area of the image occupied by the sheet portion. The dark defect of the sheet portion occurs, for example, when tablet powder or a foreign substance such as hair adheres to the sheet portion or when the cover film 4 has a break or cease. The sheet luminance threshold value $\delta y$ is set to be lower than an expected luminance of a dark defect of the sheet portion obtained in advance but to be higher than the luminance of the surface of the sheet portion. Binarization of an image obtained by the camera 61 by using the set sheet luminance threshold value $\delta y$ provides a value 0 for the presence of a foreign substance or a break and a value 1 for the sheet portion.

The luminance threshold value $\delta x1$ is set to be a relatively low value when inspection of a defective part is to be performed strictly, i.e., when there is a demand for reliably detecting a defective part. The luminance threshold values $\delta x2$ and $\delta y$ are, on the other hand, set to be relatively high values when inspection of a defective part is to be performed strictly.

Furthermore, the pre-sealing inspection unit 52 sets the luminance threshold values $\delta x1$, $\delta x2$ and $\delta y$ corresponding to respective images of the red (R) color component, the green (G) color component and the blue (B) color component, i.e., corresponding to lights of multiple different wavelength components emitted from the lighting device 60. More specifically, there are the luminance threshold values $\delta x1$, $\delta x2$ and $\delta y$ corresponding to the red (R) color component, the luminance threshold values $\delta x1$, $\delta x2$ and $\delta y$ corresponding to the green (G) color component and the luminance threshold values $\delta x1$, $\delta x2$ and $\delta y$ corresponding to the blue (B) color component. These luminance threshold values $\delta x1$, $\delta x2$ and $\delta y$ are provided separately corresponding to an image obtained by imaging the transmitted light and corresponding to an image obtained by imaging the reflected light.

The post-sealing inspection unit 53, on the other hand, sets the luminance threshold values $\delta x1$, $\delta x2$ and $\delta y$ corresponding to near-infrared light emitted from the lighting device 60.

The image/inspection condition storage device 66 is configured by, for example, a hard disk drive. The image/inspection condition storage device 66 is configured to store an inspection specification of an inspection that provides defective judgment, the date and time of the defective judgment, image data and inspection conditions used for the inspection.

The camera timing control device 67 is configured to control the imaging timing of the camera 61. The imaging timing is controlled in response to a signal from a non-illustrated encoder provided in the PTP packaging machine 11. An image is taken by the camera 61 whenever a predetermined amount of the container film 3 or the PTP film 6 is fed.

The CPU and input/output interface 68 is configured to perform various controls in the respective inspection units 52 and 53. The CPU and input/output interface 68 is configured to execute various processing programs, for example, an inspection process of the tablet 5, the container film 3 and the like by using, for example, the storage of the judgment memory 65. The CPU and input/output interface 68 is also configured to send and receive signals to and from components of the PTP packaging machine 11. This configuration enables the defective sheet discharge mechanism 40 to be controlled. The CPU and input/output interface 68 is further configured to identify an inspection range in the container film 3 or in the PTP film 6, based on the positions of the pocket portion 2 and the tablet 5 in the image.

The CPU and input/output interface 68 also serves to send various data to a predetermined display unit (not shown) such as a display. This function enables various images and inspection results to be displayed in the display unit.

The processing device 62 having the configuration described above performs a binarization process of an image obtained by the camera 61, a mass processing of a binarized image obtained by the binarization process, and a defect judgment process of determining the presence or the absence of a defective part, based on the number, the area and the position of a mass part obtained by the mass processing, as the inspection process for the tablet 5, the container film 3 and the like. The pre-sealing inspection unit 52 conducts an inspection using multiple images obtained from lights of different wavelength components and thereby enables a wide range of (multiple different) defects to be detected with high accuracy.

The following describes in detail the inspections performed in the respective inspection units 52 and 53.

The pre-sealing inspection unit 52 is configured to conduct an inspection for the presence or the absence of any foreign substance on the sheet and an inspection for the presence or the absence of any abnormality in the tablet 5. A procedure of the inspection is described in detail. The pre-sealing inspection unit 52 first binarizes an image obtained by the camera 61 using the set luminance threshold values $\delta x1$, $\delta x2$ and $\delta y$. More specifically, the pre-sealing inspection unit 52 binarizes respective images of the red (R) color component, the green (G) color component and the blue (B) color component by individually using the luminance threshold values $\delta x1$, $\delta x2$ and $\delta y$, so as to obtain multiple different binarized images. For example, the image of the red (R) color component is subjected to the binarization process using the luminance threshold values $\delta x1$, $\delta x2$ and $\delta y$ set corresponding to the red (R) color component. This provides a plurality of binarized images of the red (R) color component.

The pre-sealing inspection unit 52 subsequently causes the obtained binarized image to be subjected to a masking process with regard to an area of the pocket portion 2 or with regard to an area of the sheet portion and sets the area occupied by the pocket portion 2 or the area occupied by the sheet portion as an inspection object. The pre-sealing inspection unit 52 then causes the binarized image to be subjected to a mass processing and compares the area of a mass part with a reference value set in advance for area determination, so as to conduct an inspection for the presence or the absence of a defective part in the tablet 5 and in the sheet portion.

The post-sealing inspection unit 53 is configured to conduct an inspection for contamination or non-contamination by any foreign substance and for the presence or the absence of any abnormality in the tablet 5. A procedure of the inspection by the post-sealing inspection unit 53 is basically similar to the procedure of the inspection by the pre-sealing inspection unit 52. The post-sealing inspection unit 53, however, obtains a binarized image by using the luminance threshold values $\delta x1$, $\delta x2$ and $\delta y$ corresponding to near-infrared light.

When no defective part is found by both of the inspection units 52 and 53, the PTP sheet 1 as the inspection object is judged as non-defective. When a defective part is found by at least one of the inspection units 52 and 53, on the other hand, the PTP sheet 1 as the inspection object is judged as defective.

Each of the inspection units 52 and 53 is operable in an inspection mode that actually conducts an inspection for the tablets 5 and the sheet portion or in a verification mode that verifies the set luminance threshold values $\delta x1$, $\delta x2$ and $\delta y$, based on the images obtained by the cameras 61 The operation mode is changed over, for example, in response to input of an operation changeover signal from the verification device 54. In general, each of the inspection units 52 and 53 is operated in the inspection mode and performs an inspection process, based on the images obtained by the cameras 61.

When being operated in the verification mode, on the other hand, the respective inspection units 52 and 53 use verification images VI described later, in place of the images obtained by the cameras 61, to perform an inspection process similar to that described above. The respective inspection units 52 and 53 output information regarding obtained results of quality judgment (judgment result information) to the verification device 54. The judgment result information includes information regarding the type of each verification image VI that is the inspection object and individual results of quality judgment using the respective luminance threshold values $\delta x1$, $\delta x2$ and $\delta y$.

Figure 4:
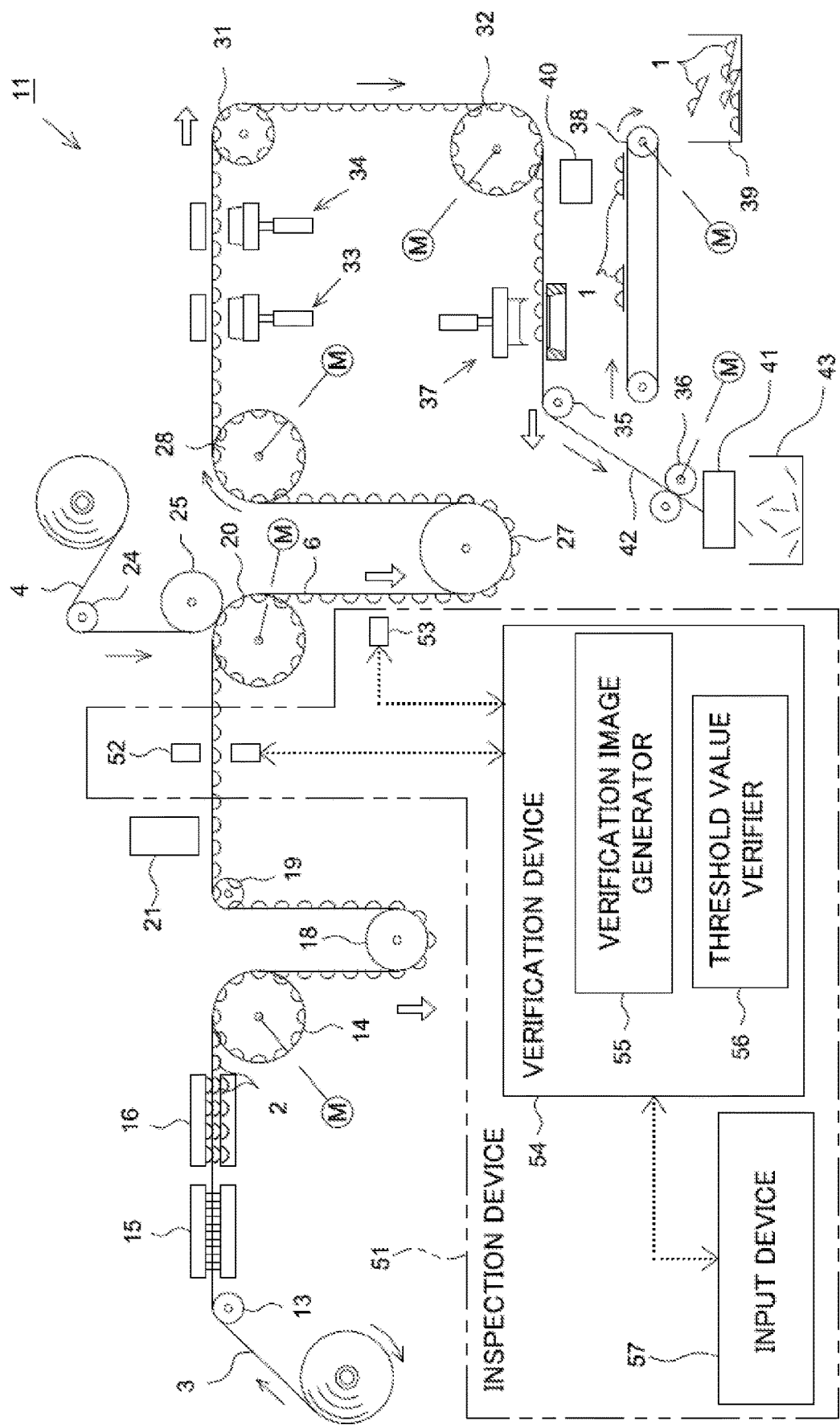
FIG. 4 is a diagram illustrating the schematic configuration of a PTP packaging machine according to one or more embodiments.
Figure 5:
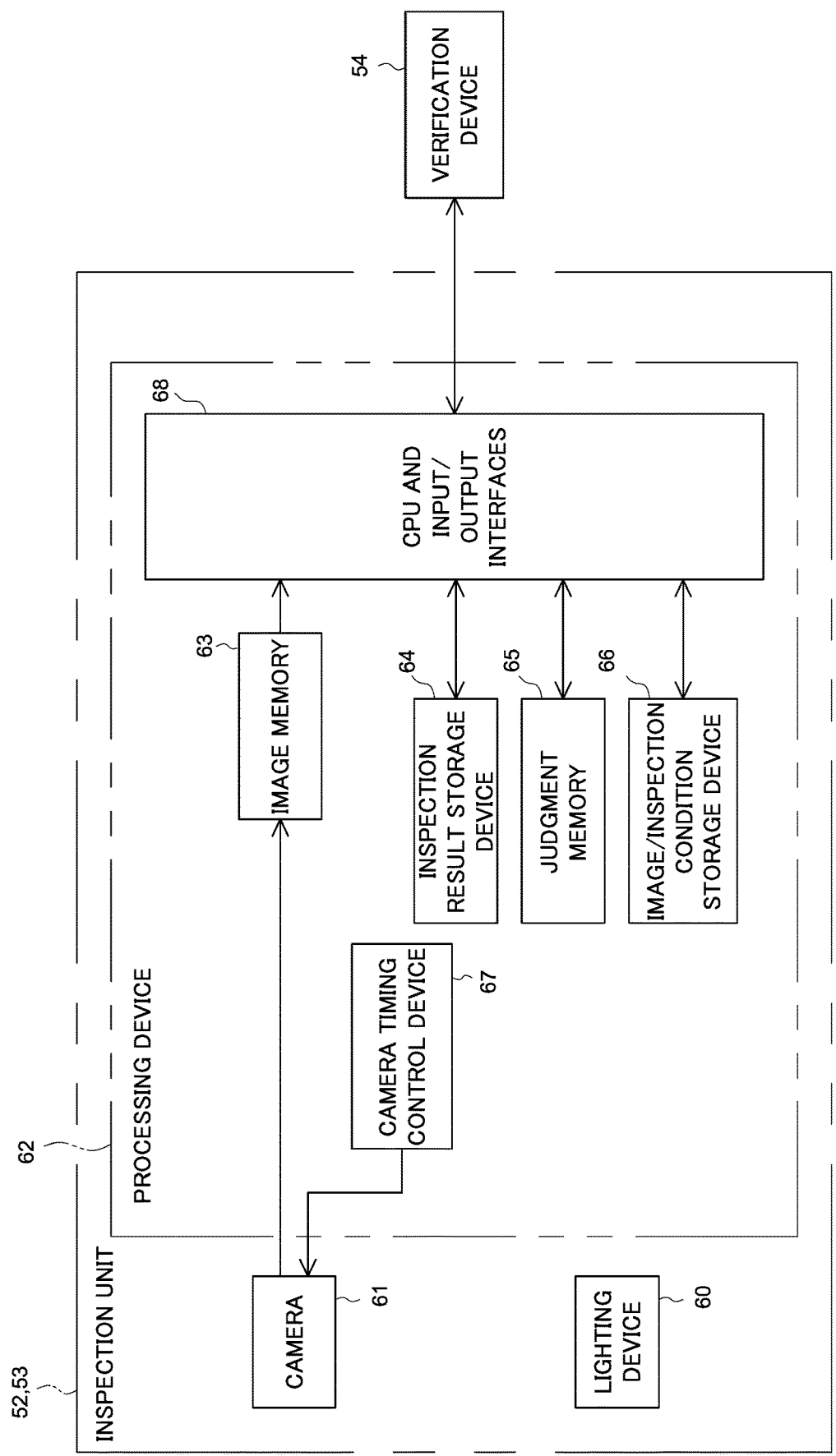
FIG. 5 is a block diagram illustrating the electrical configuration of a pre-sealing inspection unit and a post-sealing inspection unit according to one or more embodiments.

The verification device 54 is a device configured to verify whether the luminance threshold values $\delta x1$, $\delta x2$ and $\delta y$ are appropriate in each of the inspection units 52 and 53. As shown in FIG. 4, the verification device 54 includes a verification image generator 55 serving as a verification image generating unit (verification image generating circuit) and a threshold value verifier 56 serving as a threshold value verifying unit. According to one or more embodiments, the verification device 54 is provided at the same location as the installation location of the PTP packaging machine 11.

The verification device 54 is configured to be communicable with a predetermined input device 57 (for example, a keyboard) and obtain input of information regarding the operation mode in each of the inspection units 52 and 53 via the input device 57. The inspection device 54 outputs an operation changeover signal to each of the inspection units 52 and 53 to change over the operation mode of the inspection unit 52 or 53 to the inspection mode or to the verification mode. The operation mode is, however, not changed over in the stage that manufacture of the PTP sheet 1 is actually performed, based on, for example, information from an encoder provided in the PTP packaging machine 11.

Additionally, the luminance threshold values $\delta x1$, $\delta x2$ and $\delta y$ may be set and changed in each of the inspection units 52 and 53 via the input device 57. More specifically, when the luminance threshold values $\delta x1$, $\delta x2$ and $\delta y$ are input into the inspection device 54 via the input device 57, the verification device 54 outputs the input luminance threshold values $\delta x1$, $\delta x2$ and $\delta y$ to the inspection unit 52 or 53. The inspection unit 52 or 53 resets the luminance threshold values $\delta x1$, $\delta x2$ and $\delta y$, based on the input contents.

Figure 6:
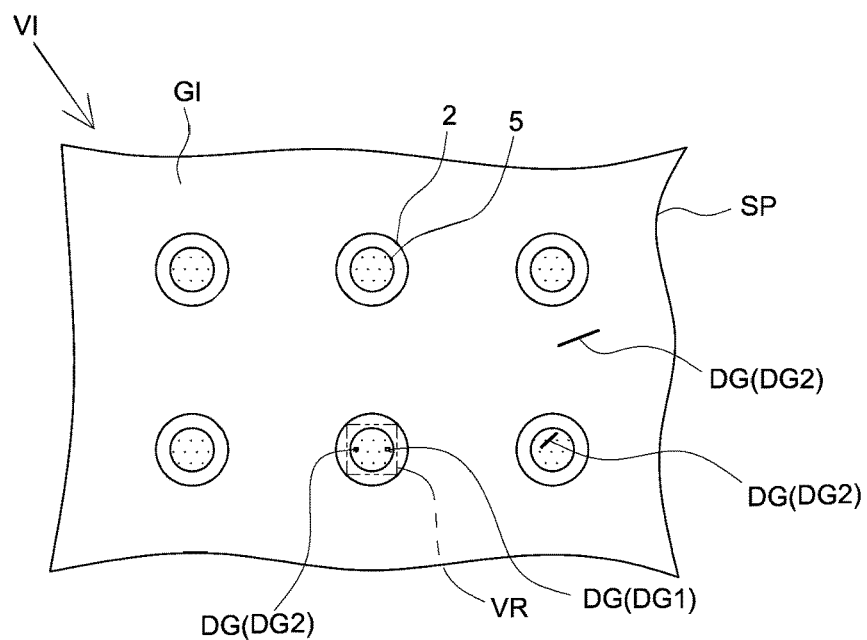
FIG. 6 is a diagram illustrating a verification image according to one or more embodiments.

As shown in FIG. 6, the verification image generator 55 generates a verification image VI where a virtual defective image DG is placed in a non-defective image GI obtained in advance. According to one or more embodiments, when the verification mode is set as the operation mode in the inspection unit 52 or 53, the verification image generator 55 generates the verification image VI. The generated verification image VI is stored in a non-illustrated predetermined storage device (for example, hard disk) provided in the verification device 54. In FIG. 6, a plurality of defective images DG are placed in the verification image VI. In general, however, one defective image DG is placed in the verification image VI.

The non-defective image GI is an image judged as non-defective by the inspection unit 52 or 53 (processing device 62) and has an identical mode with that of the image used for inspection by the inspection unit 52 or 53. The non-defective image GI may be obtained by, for example, actually taking an image of the tablets 5 and the sheet portion SP (the container film 3 or the PTP film 6) with the camera 61. The radiation conditions of light from the lighting device 60 in obtaining the non-defective image GI are identical with the radiation conditions in actually conducting an inspection of the tablets 5 and the like. The non-defective image GI may be obtained by a predetermined simulator by using conditions of inspection (for example, the types of the tablet 5, the cover film 4 and the like and the intensity of light from the lighting device 60). The non-defective image GI may also be obtained by combining image data of the tablets 5 and the sheet portion SP obtained individually.

The defective image DG simulates a defect such as a foreign substance and is placed in the tablet 5 or in the sheet portion SP of the non-defective image GI. The shape of the defective image DG may be changed appropriately.

Figure 7:
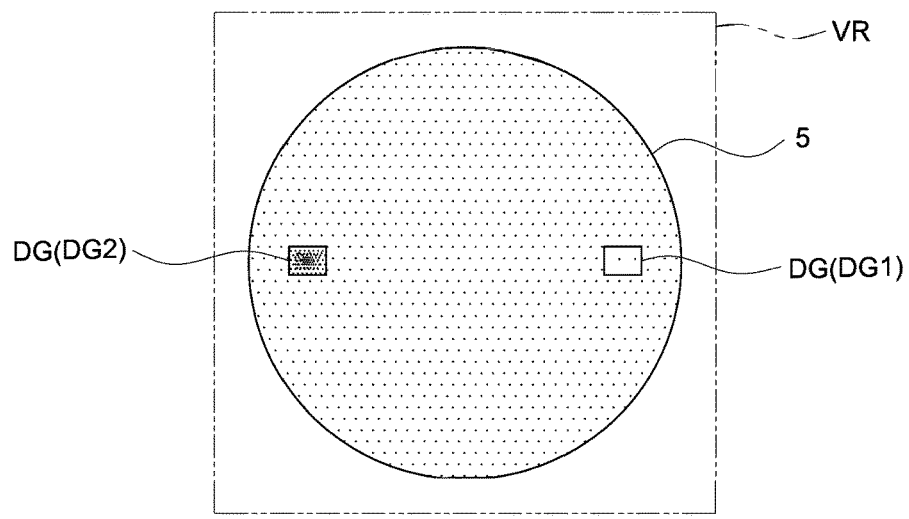
FIG. 7 is an enlarged diagram illustrating inside of a virtual rectangle in FIG. 6.

As shown in FIG. 7 (FIG. 7 is an enlarged view of a virtual rectangle VR in FIG. 6), a defective image DG includes a bright defective image DG1 and a dark defective image DG2. The bright defective image DG1 indicates a defect that is displayed in a relatively bright mode in an image and corresponds to, for example, a peeled-off sugar coat. The dark defective image DG2, on the other hand, indicates a defect that is displayed in a relatively dark mode in an image and corresponds to, for example, a foreign substance or cease of the sheet. According to one or more embodiments, the bright defective image DG1 and the dark defective image DG2 may be placed in the tablet 5, and the dark defective image DG2 may be placed in the sheet portion SP.

Furthermore, respective non-defective images GI of the red (H) color component, the green (G) color component and the blue (B) color component with defective images DG of the corresponding color components placed therein are generated as verification images VI of the pre-sealing inspection unit 52. Verification images VI are generated respectively corresponding to one camera 61 and corresponding to the other camera 61.

A non-defective image GI of near-infrared component with a defective image DG placed therein is generated, on the other hand, as a verification image VI of the post-sealing inspection unit 53.

The luminance of the defective image DG is set, on the basis of the luminance of a portion of the non-defective image GI where the defective image DG is placed. Accordingly, the luminance of the defective image DG placed in the tablet 5 of the non-defective image GI is set, on the basis of the surface luminance of the tablet 5. The luminance of the defective image DG placed in the sheet portion SP of the non-defective image GI is set, on the basis of the surface luminance of the sheet portion SP.

Figure 8:
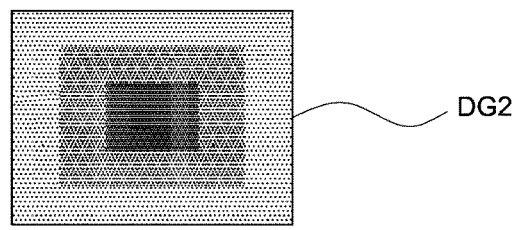
FIG. 8 is an enlarged view illustrating a dark defective image according to one or more embodiments.

Additionally, as shown in FIG. 8, a predetermined dark defective image DG2 (for example, a dark defective image DG2 simulating a foreign substance) is set in a mode of gradually increasing the luminance outward from the center thereof. In other words, the dark defective image DG2 has a luminance gradation. Accordingly, the dark defective image DG2 has a similar luminance change to that of an actually imaged foreign substance.

Figure 9:
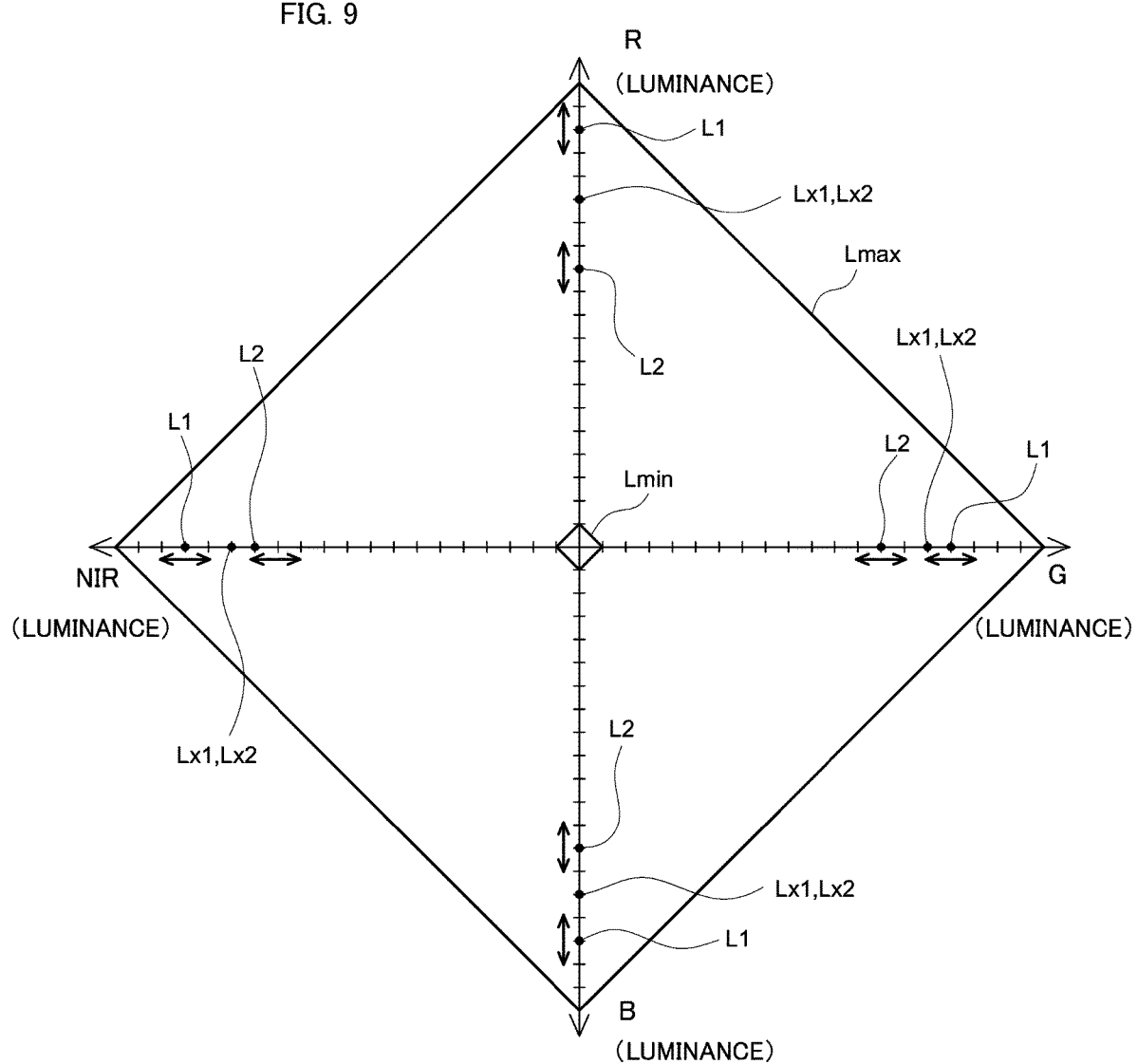
FIG. 9 is a graph illustrating a setting range of luminance of a defective image placed in a tablet according to one or more embodiments.

Furthermore, the luminances of the bright defective image DG1 and the dark defective image DG2 placed in the tablet 5 are set in the following range. More specifically, as shown in FIG. 9, when Lmax denotes a maximum level luminance set in advance (for example, a maximum luminance expected as the luminance of the bright defect) and Lx1 denotes a surface luminance of the tablet 5 where the bright defective image DG1 is to be placed therein, a luminance L1 of the bright defective image DG1 is set in a range of higher than Lx1 and lower than Lmax. When Lmin denotes a minimum level luminance set in advance (for example, a luminance simulating hair or the like) and Lx2 denotes a surface luminance of the tablet 5 where the dark defective image DG2 is to be placed therein, a luminance L2 of the dark defective image DG2 is set in a range of higher than Lmin and lower than Lx2. For example, when a relatively low value is set to the luminance threshold value δx1 and a relatively high value is set to the luminance threshold value δx2 in order to conduct a strict inspection of a defective part in the inspection unit 52 or 53, the luminance values L1 and L2 are respectively set to values closer to the surface luminances Lx1 and Lx2 of the tablet 5.

FIG. 9 shows the surface luminances Lx1 and Lx2 when the bright defective image DG1 and the dark defective image DG2 are placed at identical positions. The surface luminances Lx1 and Lx2 are accordingly equal to each other. When the bright defective image DG1 and the dark defective image DG2 are placed at different positions, however, the surface luminances Lx1 and Lx2 may be different from each other. In FIG. 9, the near-infrared (NIR) component, the red (R) color component, the green (G) color component and the blue (B) color component have identical luminances Lmax. These luminances Lmax may, however, be different from one another according to, for example, the color of the surface of the tablet 5.

Figure 10:
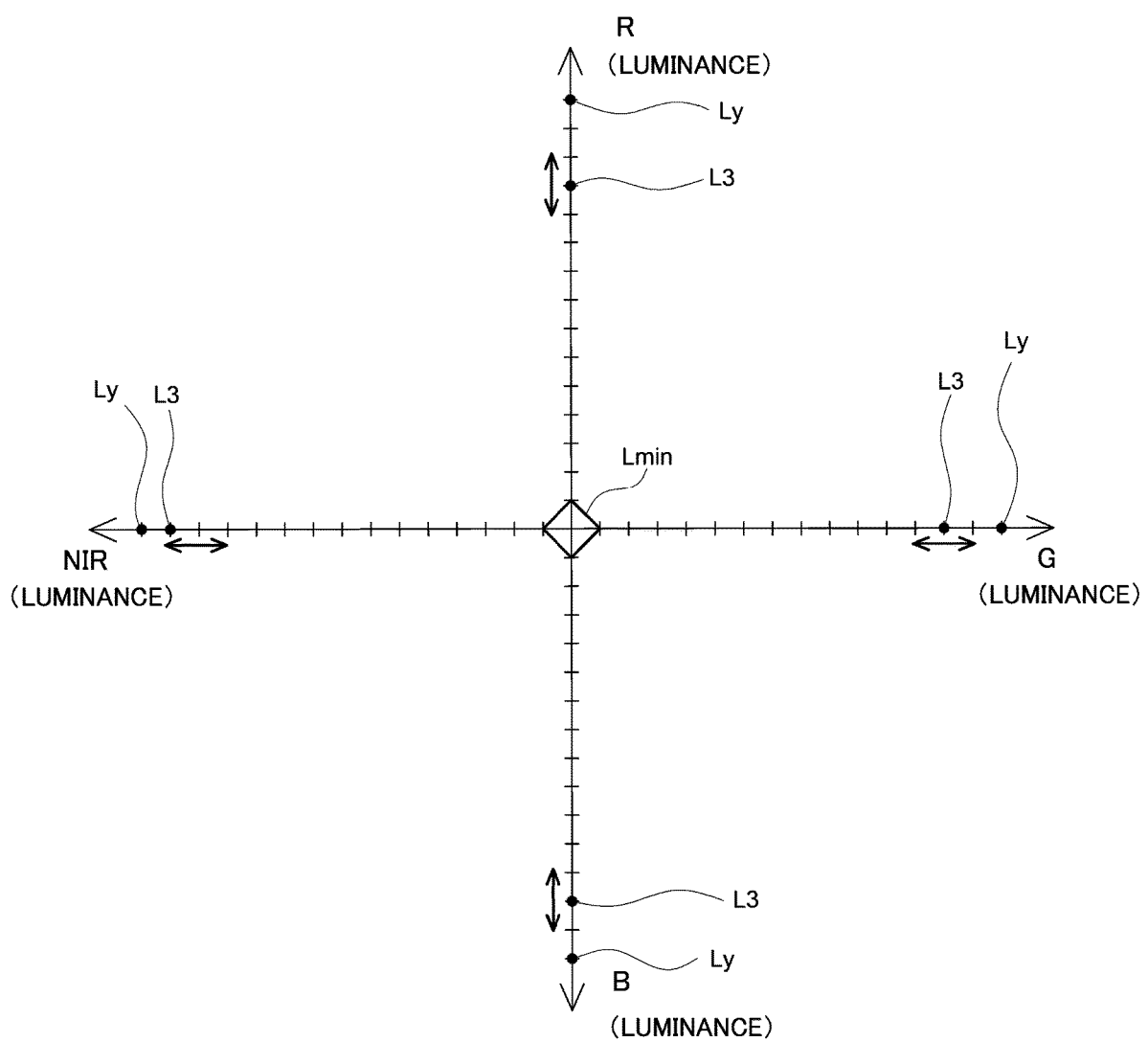
FIG. 10 is a graph illustrating a setting range of luminance of a defective image placed in a sheet portion according to one or more embodiments.

The luminance of the dark defective image DG2 placed in the sheet portion SP is, on the other hand, set in the following range. More specifically, as shown in FIG. 10, Lmin denotes a minimum level luminance set in advance (for example, a luminance simulating hair or the like) and Ly denotes a surface luminance of the sheet portion SP where the dark defective image DG2 is to be placed therein, a luminance L3 of the dark defective image DG2 is set in a range of higher than Lmin and lower than Ly. For example, when a relatively high value is set to the luminance threshold value δy, the luminance L3 is set to a value close to the surface luminance Ly of the sheet portion SP.

Additionally, the luminances of defective images DG are set independently according to the lights of the respective wavelength components. More specifically, the luminances of the defective images DG are set independently according to the lights of the near-infrared (NIR) component, the red (R) color component, the green (G) color component and the blue (B) color component. This configuration enables, for example, a relatively high value to be set to the luminance of the defective image DG placed in the non-defective image GI of the red (R) color component, while enabling a relatively low value to be set to the luminance of the defective image DG placed in the non-defective image GI of the blue (B) color component.

In the process of setting the luminance of the defective image DG, the luminance of the defective image DG may be finely adjusted according to the location of the defective image DG, by taking into account that a center part of an imaging region is likely to have a relatively high luminance and an outside part of the imaging region is likely to have a relatively low luminance and that a center part of the tablet 5 is likely to have a relatively high luminance and an outside part of the tablet 5 is likely to have a relatively low luminance.

According to one or more embodiments, a level with regard to the luminance of the defective image DG (virtual defect luminance level) may be input into the verification device 54 via the input device 57. The virtual defect luminance level is divided in, for example, multiple stages. The virtual defect luminance level is set to a maximum for detection of a very small defect. The verification image generator 55 automatically sets the luminance of the defective image DG according to the input virtual defect luminance level. For example, when the virtual defect luminance level is at the maximum, the luminance L1 of the bright defective image DG1 and the luminance L2 of the dark defective image DG2 placed in the tablet 5 are respectively set to luminances increased or decreased by one stage from the surface luminances Lx1 and Lx2 of the tablet 5. The luminance L3 of the dark defective image DG2 placed in the sheet portion SP is set to a luminance decreased by one stage from the surface luminance Ly of the sheet portion SP.

The luminance of the defective image DG may be input directly via the input device 57. A value obtained by multiplying the surface luminance of the tablet 5 or the sheet portion SP by a predetermined value may be automatically set to the luminance of the defective image DG.

Furthermore, a value obtained by adding or subtracting a predetermined value to or from the surface luminance of the tablet 5 or the sheet portion SP may be automatically set to the luminance of the defective image DG. In this case, a defective image DG having a fixed luminance difference from the surface luminance of the tablet 5 or the like may be set, irrespective of a change in type of the tablet 5, the container film 3 or the like.

The verification images VI generated by the verification image generator 55 are output to each of the inspection units 52 and 53. Each of the inspection units 52 and 53 performs an inspection process similar to actual inspection using the input verification images VI. More specifically, the pre-sealing inspection unit 52 conducts an inspection of the verification images VI of the red (R) color component, the green (G) color component and the blue (B) color component using the luminance threshold values δx1, δx2 and δy set corresponding to the respective color components. The post-sealing inspection unit 53 conducts an inspection of the verification image VI of the near-infrared (NIR) component using the luminance threshold values δx1, δx2 and δy set corresponding to the near-infrared (NIR) component. Each of the inspection units 52 and 53 outputs information regarding the results of quality judgment (judgement result information) to the verification device 54.

The threshold value verifier 56 verifies whether the set luminance threshold values δx1, δx2 and δy are appropriate, based on the judgment result information input from the respective inspection units 52 and 53. According to one or more embodiments, the threshold value verifier 56 determines that the luminance threshold values δx1, δx2 and δy of the respective inspection units 52 and 53 are appropriate, when all the individual quality judgment results of the judgment result information indicate defective in inspection using the respective luminance threshold values δx1, δx2 and δy, i.e., when a defective image DG is detected as expected.

When any of the individual quality judgment results using the respective luminance threshold values δx1, δx2 and δy indicates non-defective, on the other hand, the threshold value verifier 56 identifies the luminance threshold values δx1, δx2 and δy that are expected to be inappropriate, based on the judgment result information input from the respective inspection units 52 and 53. The threshold value verifier 56 then determines that the identified luminance threshold values δx1, δx2 and δy are inappropriate. For example, when the quality judgment result indicates non-defective in an inspection of the verification image VI of the red (R) color component corresponding to an image of the reflected light taken in the pre-sealing inspection unit 52 using the luminance threshold value δx2, the threshold value verifier 56 determines that the luminance threshold value δx2 corresponding to the red (R) color component used for inspection of the image of the reflected light taken in the pre-sealing inspection unit 52 is inappropriate.

The threshold value verifier 56 stores the appropriateness/inappropriateness determination results of the luminance threshold values δx1, δx2 and δy into the above storage device configured to store the generated verification images VI.

Furthermore, the threshold value verifier 56 performs a process of displaying the contents of the storage device in a non-illustrated predetermined display device (for example, a display). This process causes information regarding appropriateness/inappropriateness of the respective luminance threshold values δx1, δx2 and δy and the verification images VI to be displayed. The operator is allowed to perceive that the luminance threshold values δx1, δx2 and δy are appropriate or inappropriate and to check the verification images VI used for verification, based on the displayed information. The operator is also allowed to change the luminance threshold values δx1, δx2 and δy via the input device 57, based on the displayed information.

The following describes processes relating to verification of the luminance threshold values δx1, δx2 and δy described above with reference to flowcharts. The processes relating to verification include an image providing/outputting process performed in the verification image generator 55, an operation mode changeover and virtual inspection-relating process (hereinafter simply referred to as "virtual inspection-relating process") performed in the inspection units 52 and 53, and a luminance threshold value verification process performed in the threshold value verifier 56.

The image providing/outputting process performed in the verification image generator 55 is described first. The image providing/outputting process is a process of generating verification images VI and outputting the generated verification images VI to the imaging units 52 and 53.

Figure 11:
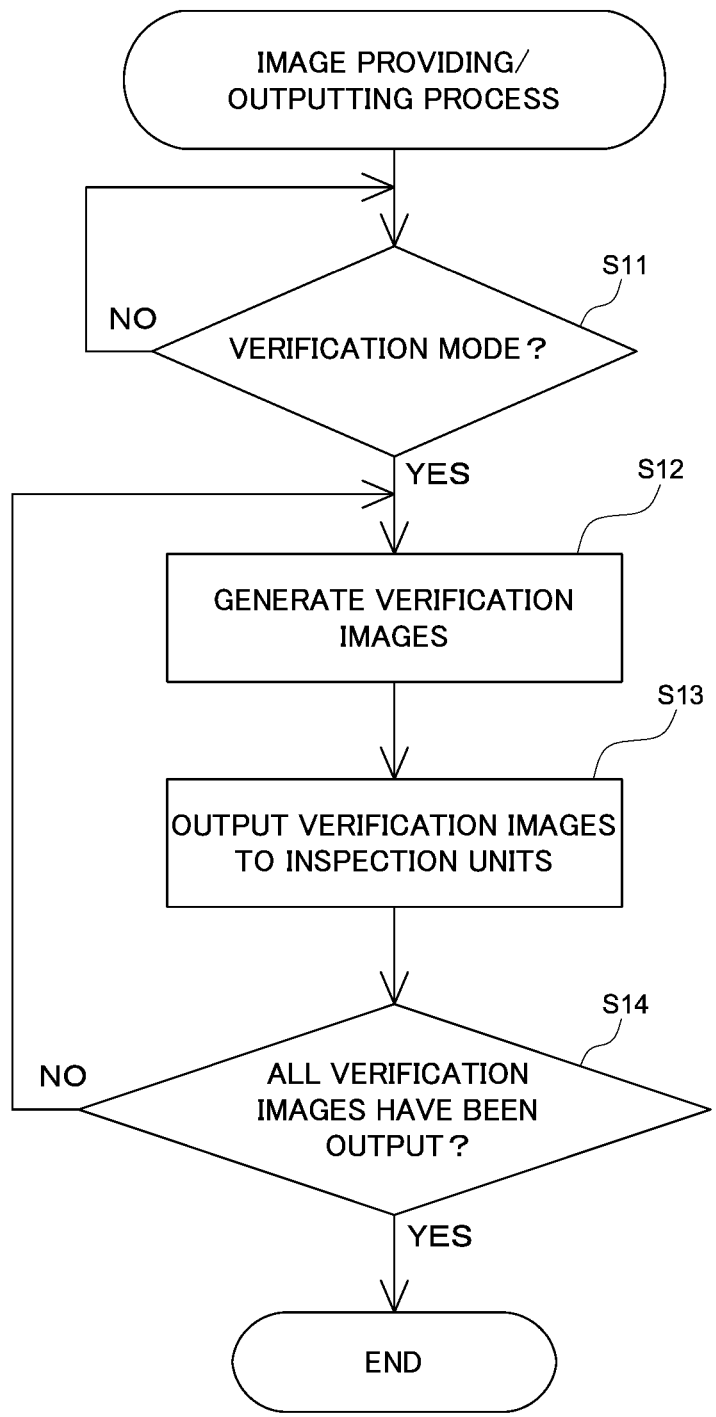
FIG. 11 is a flowchart showing an image providing/outputting process according to one or more embodiments.

As shown in FIG. 11, the image providing/outputting process first determines whether the operation mode in each of the inspection units 52 and 53 is the verification mode at step S11. This determination may be made, for example, based on the type of the operation changeover signal output from the verification device 54 to each of the inspection units 52 and 53. The determination process of step S11 is performed repeatedly until an affirmative determination is made.

When an affirmative determination is made at step S11, the image providing/outputting process generates verification images VI at step S12. The luminance of a defective image DG in a verification image VI is set, on the basis of the luminance in a location of a non-defective image GI where the defective image DG is placed as described above. The process of step S12 may be skipped by generating verification images in advance.

At subsequent step S13, the image providing/outputting process outputs the generated verification images VI to the inspection units 52 and 53.

At subsequent step S14, the image providing/outputting process determines whether all the verification images VI have been output to the inspection units 52 and 53. More specifically, it is determined whether the verification images VI of the red (R) color component, the green (G) color component and the blue (B) color component corresponding to the images of the reflected light and the transmitted light are output to the pre-sealing inspection unit 52 and whether the verification image VI of the near-infrared (NIR) component is output to the post-sealing inspection unit 53.

When a negative determination is made at step S14, the image providing/outputting process returns to step S12 and performs the processing of steps S12 and S13 until all the verification images VI are output to the inspection units 52 and 53. When an affirmative determination is made at step S14, on the other hand, the image providing/outputting process is terminated.

The virtual inspection-relating process performed in the inspection units 52 and 53 is described subsequently. The virtual inspection-relating process is a process of changing over the operation mode in each of the operation units 52 and 53 and conducting a virtual inspection using the verification images VI when the operation mode is the verification mode.

Figure 12:
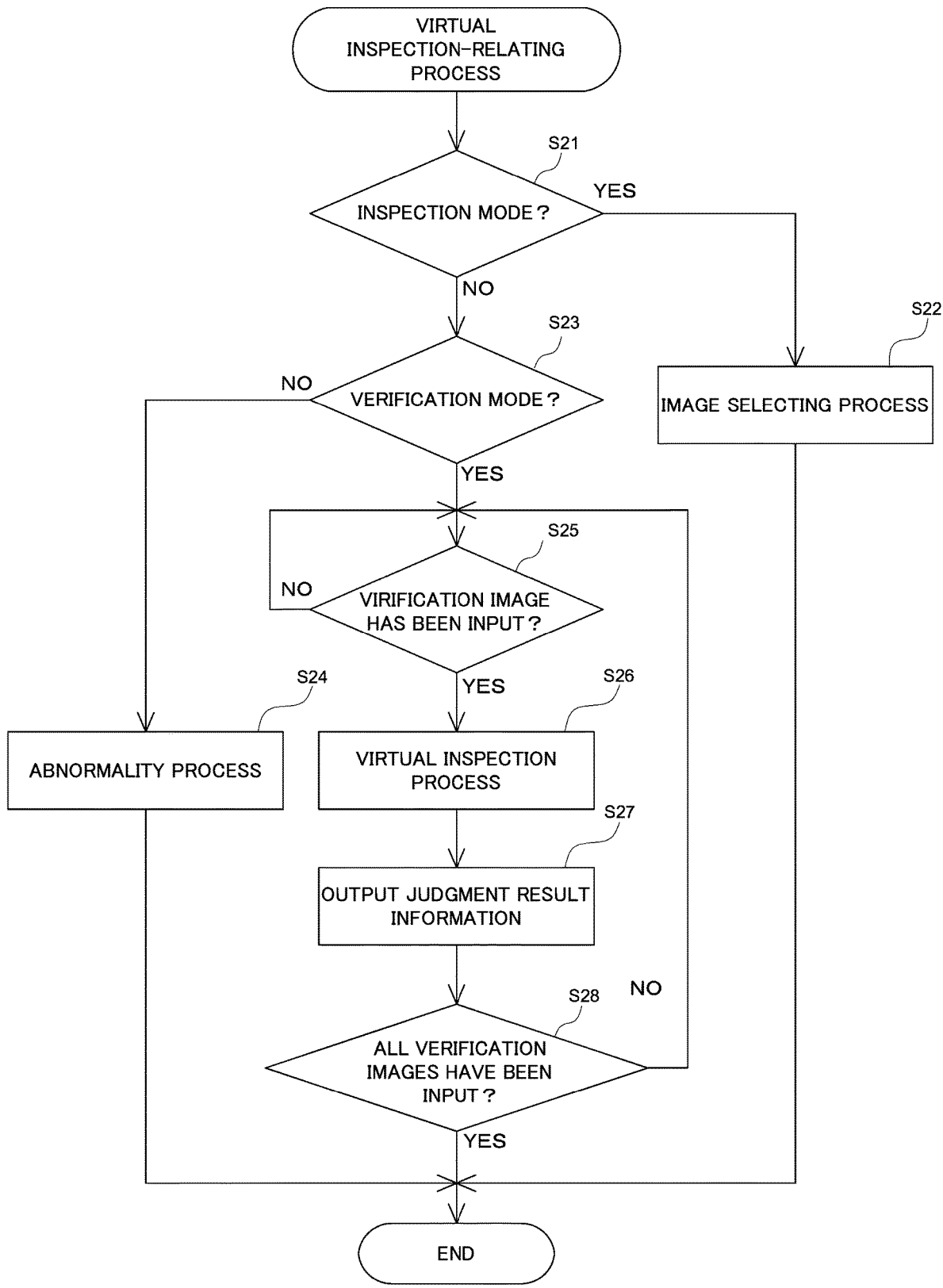
FIG. 12 is a flowchart showing a virtual inspection-relating process according to one or more embodiments.

As shown in FIG. 12, the inspection process first determines whether the operation mode in each of the operation units 52 and 53 is the inspection mode at step S21. When an affirmative determination is made at step S21, the virtual inspection-relating process performs an image selecting process at step S22 and is then terminated. The image selecting process makes settings for an ordinary inspection (inspection of the tablet 5 and the sheet portion in the manufacturing process of the PTP sheet 1), based on the images obtained by the cameras 61.

When a negative determination is made at step S21, on the other hand, the virtual inspection-relating process determines whether the operation mode in each of the inspection units 52 and 53 is the verification mode at step S23. When a negative determination is made at step S23, the virtual inspection-relating process performs an abnormality process at step S24 and is then terminated. More specifically, when the operation mode is set to neither the inspection mode to nor the verification mode, the virtual inspection-relating process determines that an abnormality occurs in the setting of the operation mode and performs the abnormality process. The abnormality process performed is, for example, a process of notifying that the operation mode is not normally set.

When an affirmative determination is made at step S23, i.e., when the operation mode is the verification mode, on the other hand, the virtual inspection-relating process determines whether a verification image VI has been input at step S25. The determination process of step S25 is repeatedly performed until an affirmative determination is made.

When an affirmative determination is made at step S25, the virtual inspection-relating process performs a virtual inspection process at step S26. The virtual inspection process conducts an inspection similar to an actual inspection using the input verification image VI. The virtual inspection process also temporarily stores information regarding the type of the input verification image VI.

At subsequent step S27, information regarding the result of quality judgment with regard to the input verification image VI (judgment result information) is output to the verification device 54. The judgment result information includes an individual result of quality judgment using the respective luminance threshold values $\delta x1$, $\delta x2$ and $\delta y$ and information regarding the type of the verification image VI as described above.

At subsequent step S28, the virtual inspection-relating process determines whether all the verification images VI have been input at step S28. This determination may be made, based on the information on the type of each of the input verification images VI stored temporarily. When a negative determination is made at step S28, i.e., when there is any verification image VI that is not yet input, the virtual inspection-relating process returns to step S25.

When an affirmative determination is made at step S28, i.e., when all the verification images VI have been input and the judgment result information with regard to these verification images VI has entirely been output to the verification device 54, on the other hand, the virtual inspection-relating process is terminated.

The luminance threshold value verification process performed in the threshold value verifier 56 is described below. The luminance threshold value verification process is a process of verifying whether the luminance threshold values $\delta x1$, $\delta x2$ and $\delta y$ are appropriate or inappropriate, based on the judgment result information input from the inspection units 52 and 53.

Figure 13:
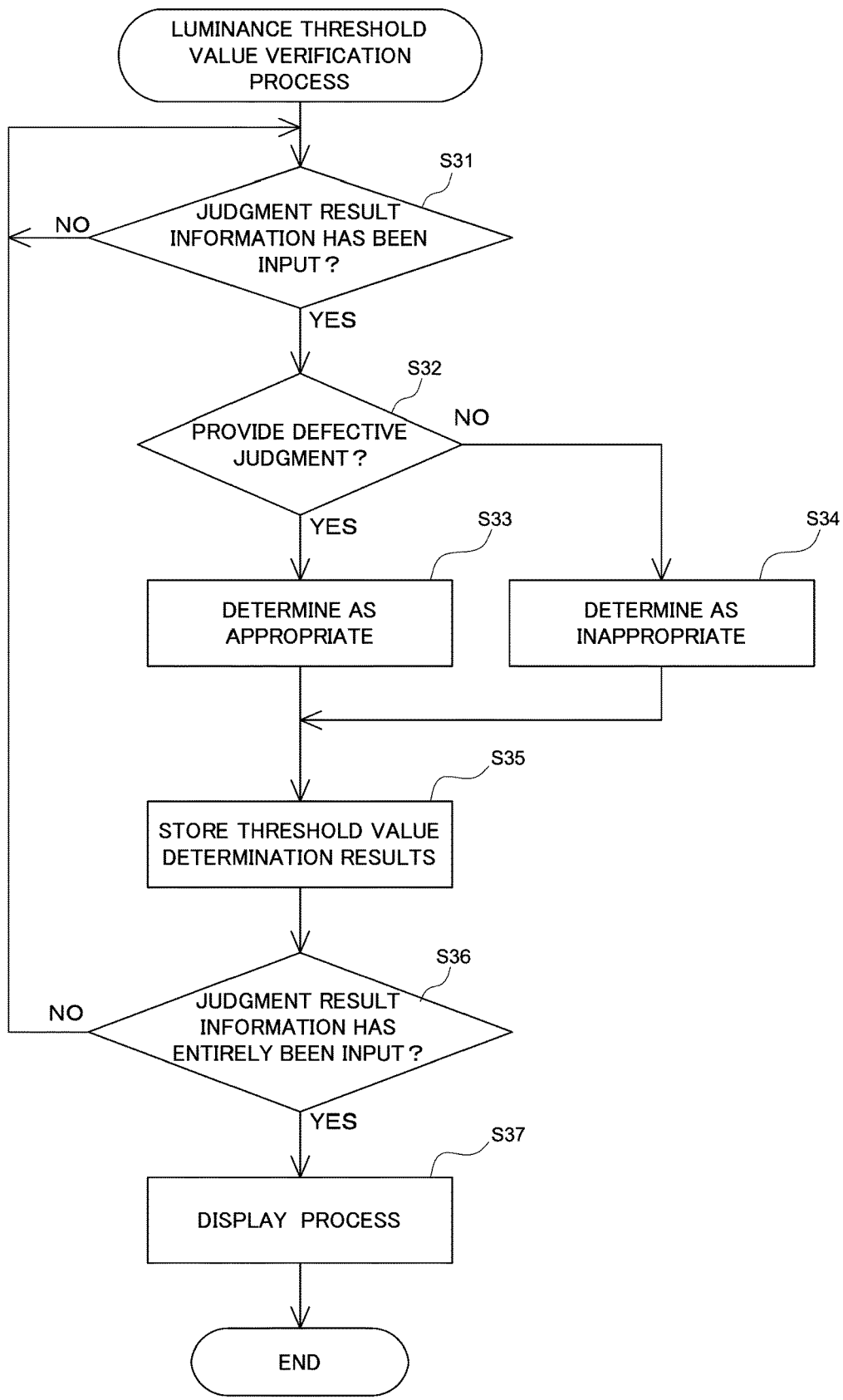
FIG. 13 is a flowchart showing a luminance threshold value verification process according to one or more embodiments.

As shown in FIG. 13, the luminance threshold value verification process first determines whether the judgment result information has been input from the inspection units 52 and 53 at step S31. This determination process is performed repeatedly until an affirmative determination is made.

When an affirmative determination is made at step S31, the luminance threshold value verification process proceeds to step S32 that refers to the judgment result information and determines whether each of the individual quality judgment results using the respective luminance threshold values $\delta x1$, $\delta x2$ and $\delta y$ provides defective judgment. More specifically, it is determined whether each of the inspection units 52 and 53 correctly recognizes the defective image DG as a defective part (i.e., whether an expected inspection result has been output). Accompanied with this determination process, the input judgment result information is stored into the storage device of the verification device 54 described above. The stored information is used to determine whether the judgment result information has entirely been input at step S36 described later.

When an affirmative determination is made at step S32, the luminance threshold value verification process proceeds to step S33 that uses the information regarding the type of each verification image VI included in the judgment result information and determines that the respective luminance threshold values $\delta x1$, $\delta x2$ and $\delta y$ corresponding this type of the verification image VI are appropriate. For example, in an inspection conducted in the pre-sealing inspection unit 52 for the verification image VI of the red (R) color component using the respective luminance threshold values $\delta x1$, $\delta x2$ and $\delta y$, when the quality judgment results respectively indicate defective judgment, it is determined that the respective luminance threshold values $\delta x1$, $\delta x2$ and $\delta y$ corresponding to the red (R) color component in the pre-sealing inspection unit 52 are appropriate.

When a negative determination is made at step S32, i.e., when any of the individual quality judgment results using the respective luminance threshold values δx1, δx2 and δy provides non-defective judgment, on the other hand, the luminance threshold value verification process proceeds to step S34. At step S34, the luminance threshold value verification process identifies the luminance threshold values δx1, δx2 and δy that are expected to be inappropriate, based on the judgment result information input from the inspection units 52 and 53 and determines that the identified luminance threshold values δx1, δx2 and δy are inappropriate.

Subsequent to step S33 or step S34, the luminance threshold value verification process stores the determination results with regard to appropriateness or inappropriateness of the luminance threshold values δx1, δx2 and δy (threshold value determination results) into the storage device of the verification device 54 described above at step S35.

The luminance threshold value verification process subsequently determines whether the judgment result information has entirely been input, based on the information of the above storage device at step S36. When a negative determination is made at step S36, i.e., when there is any judgment result information that is not yet input, the luminance threshold value verification process returns to step S31.

When an affirmative determination is made at step S36, i.e., when the judgment result information has entirely been input, on the other hand, the luminance threshold value verification process proceeds to step S37. The luminance threshold value verification process performs a display process at step S37 and is then terminated. The display process causes the information regarding appropriateness/inappropriateness of the respective luminance threshold values δx1, δx2 and δy and the verification images VI to be displayed in the above display device.

As described above, according to one or more embodiments, a verification of the luminance threshold values δx1, δx2 and δy used for detection of a defect may be conducted by using the verification images VI. Accordingly, there is no need to actually provide a defective sheet (sheet expected to provide defective judgment) or to actually conduct an inspection for the purpose of verification. This significantly reduces the labor and the time required for the verification. Since the defective sheet is not required, there is no occurrence of flow-out of any foreign substance from the defective sheet. Additionally, verification can be performed by providing verification images VI even at the stage that there is no actual object such as the tablet 5 or the container film 3 as the inspection object. This configuration enhances the convenience of verification.

The luminance of an inspection object portion (tablet 5 or sheet portion SP) generally differs depending on the type of the tablet 5 or the constituent material of the sheet portion SP. One possible measure may use a commonly usable defective image, irrespective of the difference in type of the tablet 5. The luminance of this defective image is, for example, a luminance simulating hair and is set to have a sufficiently large luminance difference from the inspection object portion. Accordingly, the luminance of this defective image is the minimum level luminance Lmin shown in FIG. 9 or FIG. 10.

The verification using the defective image is, however, only verification of whether a defect having the minimum level of luminance threshold values is detectable. This is not capable of verifying whether the luminance threshold values provide a required detection capability of a defect, when there is a requirement for the higher detection capability of a defect (when there is a requirement for detection of the smaller foreign substance).

According to one or more embodiments, on the other hand, the luminance of the defective image DG is set on the basis of the luminance of the portion of the non-defective image GI where the defective image DG is placed. This configuration allows for verification of whether the luminance threshold values δx1, δx2 and δy are appropriate in detection of a defect having a luminance that is close to the luminance of the tablet 5 or the sheet portion SP. This configuration is capable of verifying whether the luminance threshold values δx1, δx2 and δy provide a required detection capability of a defect.

Furthermore, the luminance of the defective image DG is set independently according to the light of each wavelength component. This configuration enables the luminance of the defective image DG to be appropriately set for each of the images obtained by using the lights of different wavelength components. As a result, this allows for verification of whether the luminance threshold values are appropriate in detection of a wide range of defects.

Additionally, the respective luminances of the dark defective image DG2 and the bright defective image DG1 are set on the basis of a portion of the non-defective image GI where the defective image DG is placed. This configuration accordingly allows for verification of whether the luminance threshold values δx1, δx2 and δy are appropriate in detection of a dark defect and a bright defect. More specifically, this configuration allows for verification of whether the luminance threshold values δx1, δx2 and δy are appropriate in detection of a wider range of defects.

The predetermined dark defective image DG2 is set to gradually increase the luminance outward from the center thereof and has an identical mode with the mode of an image of a foreign substance obtained when the image of the foreign substance is actually taken in inspection. This configuration allows for verification of the luminance threshold values δx1, δx2 and δy conforming to the actual inspection.

The present invention is not limited to the description of the above embodiments but may also be implemented, for example, by configurations described below. The present invention may further be implemented by other applications and other modifications that are not specifically described below.

(a) According to the above embodiments, white light is emitted from the lighting device 60 of the pre-sealing inspection unit 52. More specifically, the lighting device 60 is configured to simultaneously radiate lights of multiple different wavelength components. According to a modification, the lighting device 60 may be configured to separately radiate lights of multiple different wavelength components. The lighting device 60 may also be configured to radiate only a predetermined monochromatic light (for example, red light).

(b) According to the above embodiments, the pre-sealing inspection unit 52 is configured to perform the quality judgment of the tablet 5 or the like by using the images of the red (R) color component, the green (G) color component and the blue (B) color component. According to a modification, the pre-sealing inspection unit 52 may be configured to perform the quality judgment of the tablet 5 or the like by using a general color image obtained by radiation of white light. In this modification, the luminance of the defective image DG is set on the basis of the luminances of the tablet 5 and the sheet portion SP in the non-defective image GI corresponding to white light.

(c) The configurations of the inspection units 52 and 53 may be modified appropriately. For example, the post-sealing inspection unit 53 may be configured as a transmission-type inspection unit, in place of the reflection-type inspection unit.

(d) The luminance threshold values δx1, δx2 and δy described in the above embodiments are only illustrative, and the luminance threshold values used may be changed appropriately. For example, according to the above embodiments, no luminance threshold values are set for detection of a bright defect in the sheet portion. In the post-sealing inspection unit 53 configured as the transmission-type inspection unit as described in above (c), a defective part such as a break of the cover film 4 is likely to appear at a relatively high luminance. In other words, the defective part is a bright defect. Accordingly, luminance threshold values may be newly set for detection of a bright defect in the sheet portion SP.

With a view to detecting multiple different types of defects more reliably, multiple sets of luminance threshold values may be used for detection of a dark defect or multiple sets of luminance threshold values may be used for detection of a bright defect.

(e) According to the above embodiments, the inspection device 54 is placed at the same location as the installation location of the PTP packaging machine 11. According to a modification, the inspection device 54 may be provided at a different location from the installation location of the PTP packaging machine 11, and the verification device 54 and the respective inspection units 52 and 53 may be configured to establish remote communication. The verification of whether the luminance threshold values δx1, δx2 and δy are appropriate or inappropriate in each of the inspection units 52 and 53 may be performed remotely.

In this modification, for example, the verification device 54 may collectively perform inspection of the luminance threshold values in inspection units provided in multiple PTP packaging machines. More specifically, the verification device 54 may intensively perform inspection of the luminance threshold values in multiple inspection units placed at different locations.

Additionally, a modified configuration may individually provide a threshold value verification unit of a verification device in each of PTP packaging machines and may provide a verification image generator of the verification device separately from the respective PTP packaging machines. This modified configuration may send required verification images from the verification image generator to the PTP packaging machines.

(f) The above embodiments is configured to inspect a portion that eventually forms the PTP sheet 1 in the manufacturing process of the PTP sheet 1. A modification may be configured to inspect the PTP sheet 1 as the final product.

(g) The above embodiments concretely describes the configuration for the tablet 5 as the content. The content may, however, be a capsule (for example, a medical product or a nutrition product)

(h) According to the above embodiments, the container film 3 is made of a thermoplastic resin material such as PP or PVC, and the cover film 4 is formed by using aluminum foil or the like as the base material. The materials of the respective films 3 and 4 are, however, not limited to these materials but may be other materials.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet (content), 11 . . . PTP packaging machine, 51 . . . inspection device, 55 . . . verification image generator (verification image generating unit), 56 . . . threshold value verifier (threshold value verifying unit), 60 . . . lighting device (irradiator), 61 . . . camera (imaging unit), 62 . . . processing device (quality judgment unit), DG . . . defective image, DG1 . . . bright defective image, DG2 . . . dark defective image, GI . . . non-defective image, VI . . . verification image

The invention claimed is:

1. An inspection device for inspecting an inspection object portion, in a Press-Through-Pack (PTP) sheet comprising a pocket portion formed in a container film to house a content, and a cover film bonded to the container film to close the pocket portion, or in a portion of a PTP film that forms the PTP sheet, the inspection device comprising:
an irradiator that irradiates the inspection object portion with light;
an imaging device that takes an image of the inspection object portion irradiated with the light emitted from the irradiator;
a processor that detects a defect in the inspection object portion from the image taken by the imaging device by using a predetermined luminance threshold value, and determines whether the inspection object portion is non-defective or defective;
a verification image generating circuit that generates a verification image in which a virtual defective image is placed in a non-defective image determined as non-defective by the processor, wherein the defective image simulates a defect including a foreign substance; and
a threshold value verifier that causes the processor to determine whether the inspection object portion is non-defective or defective by using the verification image, in place of the image taken by the imaging device, and to verify the luminance threshold value based on a determination result by the processor, wherein
the irradiator radiates lights of multiple different wavelength components, and
a luminance of the defective image is set independently according to the light of each of the wavelength components, with a luminance of a portion corresponding to the defective image in the non-defective image as a reference, the non-defective image being taken for each of the multiple different wavelength components.

2. An inspection device for inspecting an inspection object portion, in a Press-Through-Pack (PTP) sheet comprising a pocket portion formed in a container film to house a content, and a cover film bonded to the container film to close the pocket portion, or in a portion of a PTP film that forms the PTP sheet, the inspection device comprising:
an irradiator that irradiates the inspection object portion with light;
an imaging device that takes an image of the inspection object portion irradiated with the light emitted from the irradiator;

a processor that detects a defect in the inspection object portion from the image taken by the imaging device by using a predetermined luminance threshold value, and determines whether the inspection object portion is non-defective or defective;

a verification image generating circuit that generates a verification image in which a virtual defective image is placed in a non-defective image determined as non-defective by the processor; and a threshold value verifier that causes the processor to determine whether the inspection object portion is non-defective or defective by using the verification image, in place of the image taken by the imaging device, and to verify the luminance threshold value based on a determination result by the processor, wherein the irradiator radiates lights of multiple different wavelength components, a luminance of the defective image is set independently according to the light of each of the wavelength components, with a luminance of a portion corresponding to the defective image in the non-defective image as a reference, the non-defective image being taken for each of the multiple different wavelength components, and the defective image includes:
- a dark defective image having a luminance set to be lower than the luminance of the portion corresponding to the defective image in the non-defective image; and
- a bright defective image having a luminance set to be higher than the luminance of the portion corresponding to the defective image in the non-defective image.

3. An inspection device for inspecting an inspection object portion, in a Press-Through-Pack (PTP) sheet comprising a pocket portion formed in a container film to house a content, and a cover film bonded to the container film to close the pocket portion, or in a portion of a PTP film that forms the PTP sheet, the inspection device comprising:
- an irradiator that irradiates the inspection object portion with light;
- an imaging device that takes an image of the inspection object portion irradiated with the light emitted from the irradiator;
- a processor that detects a defect in the inspection object portion from the image taken by the imaging device by using a predetermined luminance threshold value, and determines whether the inspection object portion is non-defective or defective;
- a verification image generating circuit that generates a verification image in which a virtual defective image is placed in a non-defective image determined as non-defective by the processor; and
- a threshold value verifier that causes the processor to determine whether the inspection object portion is non-defective or defective by using the verification image, in place of the image taken by the imaging device, and to verify the luminance threshold value based on a determination result by the processor, wherein the irradiator radiates lights of multiple different wavelength components, a luminance of the defective image is set independently according to the light of each of the wavelength components, with a luminance of a portion corresponding to the defective image in the non-defective image as a reference, the non-defective image being taken for each of the multiple different wavelength components, and the defective image has a luminance that is set to be lower than the luminance of the portion corresponding to the defective image in the non-defective image, and set to gradually increase outward from a center of the defective image.

4. The inspection device according to claim 2, wherein the defective image has a luminance that is set to be lower than the luminance of the portion corresponding to the defective image in the non-defective image, and set to gradually increase outward from a center of the defective image.

5. A PTP packaging machine, comprising the inspection device according to claim 1.

6. A PTP packaging machine, comprising the inspection device according to claim 2.

7. A PTP packaging machine, comprising the inspection device according to claim 3.

8. A PTP packaging machine, comprising the inspection device according to claim 4.

* * * * *